(12) United States Patent
Huang

(10) Patent No.: US 9,684,609 B2
(45) Date of Patent: Jun. 20, 2017

(54) ELECTRONIC DEVICE WITH INTEGRATION FUNCTION AND MULTIPLE DEVICES INTEGRATING CONTROL METHOD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Hung-Chi Huang, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 96 days.

(21) Appl. No.: 14/692,124

(22) Filed: Apr. 21, 2015

(65) Prior Publication Data
US 2016/0188497 A1   Jun. 30, 2016

(30) Foreign Application Priority Data
Dec. 30, 2014   (TW) .............................. 103146391 A

(51) Int. Cl.
| | |
|---|---|
| *G06F 13/10* | (2006.01) |
| *G09G 5/12* | (2006.01) |
| *G06F 1/16* | (2006.01) |
| *G06F 1/26* | (2006.01) |

(52) U.S. Cl.
CPC .......... *G06F 13/102* (2013.01); *G06F 1/1616* (2013.01); *G06F 1/1662* (2013.01); *G06F 1/266* (2013.01); *G09G 5/12* (2013.01); *G09G 2330/02* (2013.01); *G09G 2360/08* (2013.01); *G09G 2370/22* (2013.01)

(58) Field of Classification Search
CPC .......... G06F 13/00; G06F 1/00; G06F 13/387; G06F 2213/4002
USPC .......................... 710/313, 316; 713/340, 300
See application file for complete search history.

(56) References Cited

U.S. PATENT DOCUMENTS

| | | | | |
|---|---|---|---|---|
| 6,157,958 | A   * | 12/2000 | Armitage | G06F 1/1626 |
| | | | | 709/250 |
| 6,314,522 | B1 * | 11/2001 | Chu | G06F 1/1616 |
| | | | | 361/679.4 |
| 6,363,493 | B1 * | 3/2002 | Williams | G06F 11/142 |
| | | | | 714/1 |
| 2002/0085343 | A1* | 7/2002 | Wu | G06F 1/1616 |
| | | | | 361/679.55 |
| 2003/0007321 | A1* | 1/2003 | Dayley | G06F 1/181 |
| | | | | 361/679.6 |
| 2003/0154291 | A1* | 8/2003 | Ocheltree | G06F 1/1613 |
| | | | | 709/228 |
| 2003/0172318 | A1* | 9/2003 | Sugita | G06F 1/266 |
| | | | | 714/25 |

(Continued)

*Primary Examiner* — Christopher Shin
(74) *Attorney, Agent, or Firm* — Steven Reiss

(57) ABSTRACT

A multiple device integrating control method, includes: detecting whether a first connection port of an electronic device is connected to a first device; determining whether a power port of the electronic device is connected to a power adapter when the first connection port is connected to the first device; and driving a processor of the first device to work and cooperate with a processor of the electronic device to compute.

18 Claims, 6 Drawing Sheets

(56) References Cited

U.S. PATENT DOCUMENTS

| | | | |
|---|---|---|---|
| 2004/0136166 A1* | 7/2004 | Sullivan | G06F 1/16 361/728 |
| 2005/0144495 A1* | 6/2005 | Nakajima | G06F 1/266 713/340 |
| 2006/0195824 A1* | 8/2006 | Iwamoto | G06F 9/4425 717/133 |
| 2007/0101173 A1* | 5/2007 | Fung | G06F 1/3209 713/300 |
| 2007/0167081 A1* | 7/2007 | Edelson | G06F 1/181 439/638 |
| 2007/0240006 A1* | 10/2007 | Fung | G06F 1/32 713/323 |
| 2008/0052504 A1* | 2/2008 | Tsuji | G06F 9/4418 713/1 |
| 2010/0241799 A1* | 9/2010 | Schuette | G06F 3/0626 711/104 |
| 2012/0173732 A1* | 7/2012 | Sullivan | G06F 1/1607 709/226 |
| 2014/0250317 A1* | 9/2014 | Tran | G06F 1/266 713/340 |
| 2015/0095714 A1* | 4/2015 | Huang | G06F 11/26 714/43 |

* cited by examiner

ELECTRONIC DEVICE WITH INTEGRATION FUNCTION AND MULTIPLE DEVICES INTEGRATING CONTROL METHOD

CROSS-REFERENCE TO RELATED APPLICATIONS

This application claims priority to Taiwanese Patent Application No. 103146391 filed on Dec. 30, 2014, the contents of which are incorporated by reference herein.

FIELD

The present disclosure relates to electronic devices, and particularly to an electronic device capable of integrating with another electronic device and a multiple device integrating control method.

BACKGROUND

Nowadays, electronic devices, such as mobile phones, tablet computers, are more and more popular. People often own two or more electronic devices, for example, a person can both own a mobile phone and a tablet computer. However, the electronic devices usual work independently.

BRIEF DESCRIPTION OF THE DRAWINGS

Implementations of the present technology will now be described, by way of example only, with reference to the attached figures.

DETAILED DESCRIPTION

Figure 1:
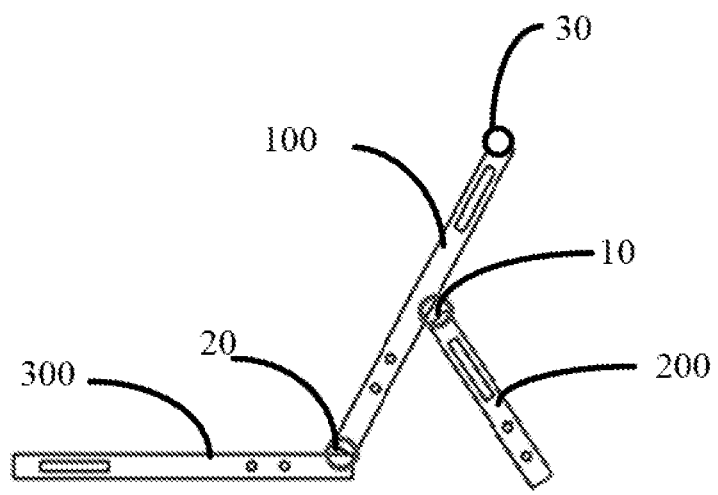
FIG. 1 is a diagrammatic view of an electronic device with integration function which integrate with another device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or computing modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like. The connection can be such that the objects are permanently connected or releasably connected.

FIG. 1 illustrates an electronic device 100 with an integration function (hereinafter: electronic device 100) includes a first connection port 10 and a second connection port 20. The electronic device 100 can connect to a first device 200 via the first connection port 10 to form an integrated device which includes two devices, namely the electronic device 100 and the first device 200. The electronic device 100 can further connect to a second device 300 via the second connection port 20 to form another integrated device which includes three devices, namely the electronic device 100, the first device 200, and the second device 300.

Figure 2:
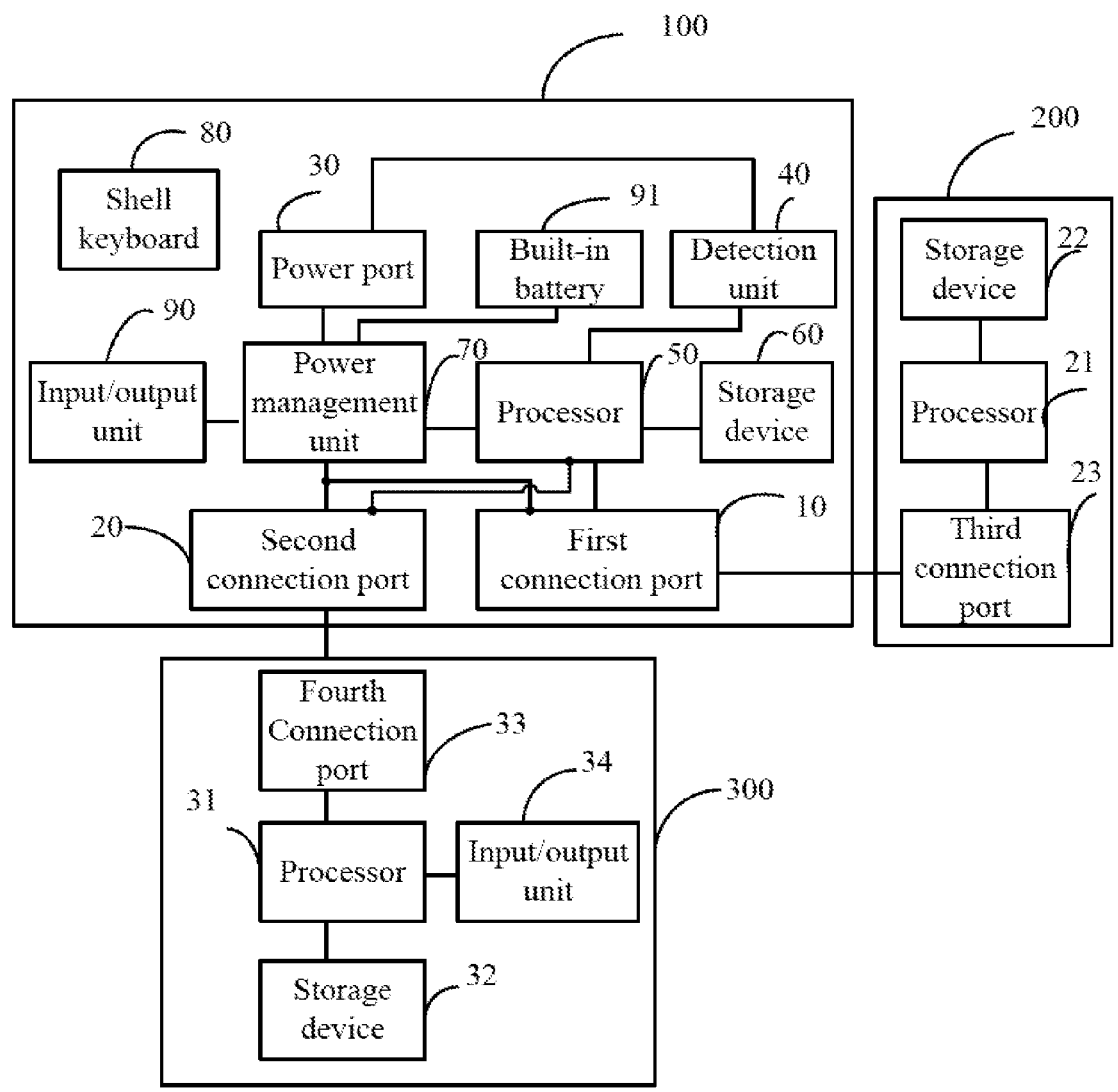
FIG. 2 is an block diagram of the electronic device with integration function of FIG. 1.

FIG. 2 illustrates the electronic device 100 further includes a power port 30, a detection unit 40, a processor 50, and a storage device 60, and a power management unit 70. The power port 30 is used to connect to a power adapter (not shown) to receive an alternating current (AC) power source. The detection unit 40 is used to detect a voltage of the power port 30 to produce a corresponding detection signal. The processor 50 is connected to the detection unit, the storage device 60, the first connection port 10, and the second connection port 20.

The first device 200 includes a processor 21 and a storage device 22, the second device 300 includes a processor 31 and a storage device 32. The electronic device 100, the first device 200, and the second device 300 can be one of a mobile phone, a tablet computer, and the like.

Figure 3:
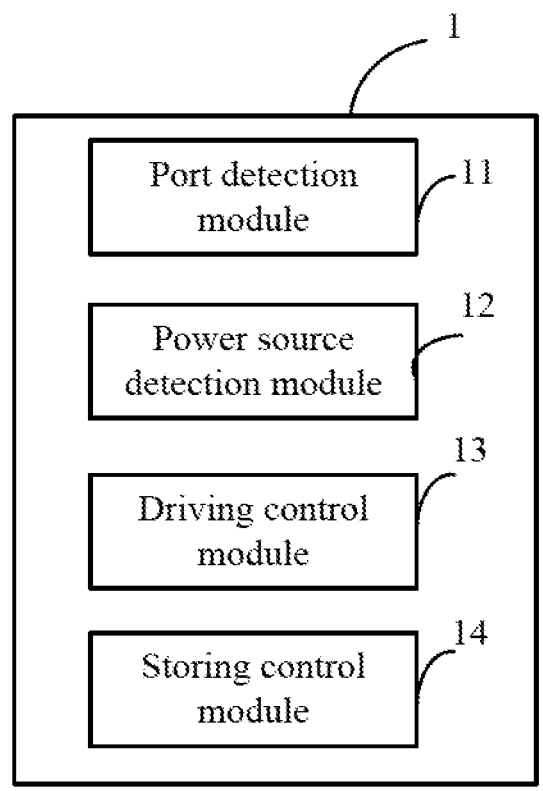
FIG. 3 is a block diagram of a multiple device integrating control system running in the electronic device with integration function of FIG. 1.

FIG. 3 illustrates a multiple device integrating control system 1. The multiple device integrating control system 1 includes a port detection module 11, a power source detection module 12, a driving control module 13, and a storing control module 14.

In the embodiment, the port detection module 11, the power source detection module 12, the driving control module 13, and the storing control module 14 can be collections of software instructions stored in the storage device 60 of the electronic device 100 and executed by the processor 50 of the electronic device 100. The modules of the multiple device integrating control system 1 also can include functionality represented as hardware or integrated circuits, or as software and hardware combinations, such as a special-purpose processor or a general-purpose processor with special-purpose firmware.

In one embodiment, each one of the processors 50, 21, 31 can be a central processing unit, a digital signal processor, or a single chip, for example. In one embodiment, each one of the storage devices 60, 22, and 32 can be an internal storage system, such as a flash memory, a random access memory (RAM) for temporary storage of information, and/or a read-only memory (ROM) for permanent storage of information. Each one of the storage devices 60, 22, and 32 can also be a storage system, such as a hard disk, a storage card, or a data storage medium. Each one of the storage devices 60, 22, and 32 can include volatile and/or non-volatile storage devices. In at least one embodiment, each one of the storage devices 60, 22, and 32 can include two or more storage devices such that one storage device is a memory and the other storage device is a hard drive. Additionally, one or more of the storage devices 60, 22, and 32 can be respectively located either entirely or partially external relative to the electronic server 100, the first device 200, and the second device 300.

The port detection module 11 is used to detect whether the first connection port 10 is connected to the first device 200. In detail, the port detection module 11 sends a handshake signal via the first connection port 10, and detects whether a response signal is received from the first connection port 10, when the port detection module 11 receives the response signal, the port detection module 11 determines the first connection port 10 is connected to the first device 200.

When the port detection module 11 determines the first connection port 10 is connected to the first device 200, the power source detection module 12 determines whether the power port 30 is connected to the power adapter according to the detection signal produced by the detection unit 40. In detail, in the embodiment, when the detection unit 40 detects a high voltage from the power port 30, the detection unit 40 produces a first detection signal, when the detection unit 40 detects a low voltage from the power port 30, the detection unit 40 produces a second detection signal. The power source detection module 12 determines the power port 30 is connected to the power adapter when receiving the first detection signal, and determines the power port 30 does not connect to the power adapter when receiving the second detection signal.

The driving control module 13 is used to drive the processor 21 of the first device 200 to work and cooperate with the processor 50 of the electronic device 100 to compute. Therefore, the computing capacity of the electronic device 100 can be enhanced.

The storing control module 14 is used to control the storage device 60 of the electronic device 100 and the storage device 22 of the first device 200 to establish data connection, and control to store data to any one of the storage device 60 and the storage device 22 when there is a need to store the data.

As shown in FIG. 2, the power management unit 70 is connected to the first connection port 10 and the power port 30, and is used to provide a power voltage to the first connection port 10 when the power port 30 is connected to the power adapter, thus powering the first device 200 connected to the first connection port 10.

In one embodiment, the first connection port 10 is set at a backside of the electronic device 100 and the first connection port 10 can be a mini universal serial bus (USB) male plug. The first device 200 further includes a third connection port 23, which can be a mini USB female port. The third connection port 23 of the first device 200 can be set at an upper end or a bottom end of the first device. After the first device 200 is connected to the electronic device 100 via mating the third connection port 23 with the first connection port 10, the first device 200 can be used as a support for the electronic device 100. Thus supporting the first device 200 vertically at a certain angle. In the embodiment, the first connection port 10 can be set on the backside of the electronic device 100 rotatably and can be received in the backside of the electronic device 100. When the first connection port 10 is needed to connect to the first device 200, the first connection port 10 can be rotated to face the third connection port 23 of the first device 200 and mate with the third connection port 23 of the first device 200.

In one embodiment, when the power source detection module 12 determines the power port 30 does not connect to the power adapter, the driving control module 13 does not drive the processor 21 of the first device 200 to work. At this time, the first device 200 only functions as the support for the electronic device 100. At the same time, namely when the power source detection module 12 determines the power port 30 does not connect to the power adapter, if there is a need to store data, the storing control module 14 only stores the data to the storage device 60 of the electronic device 100.

Figure 4:
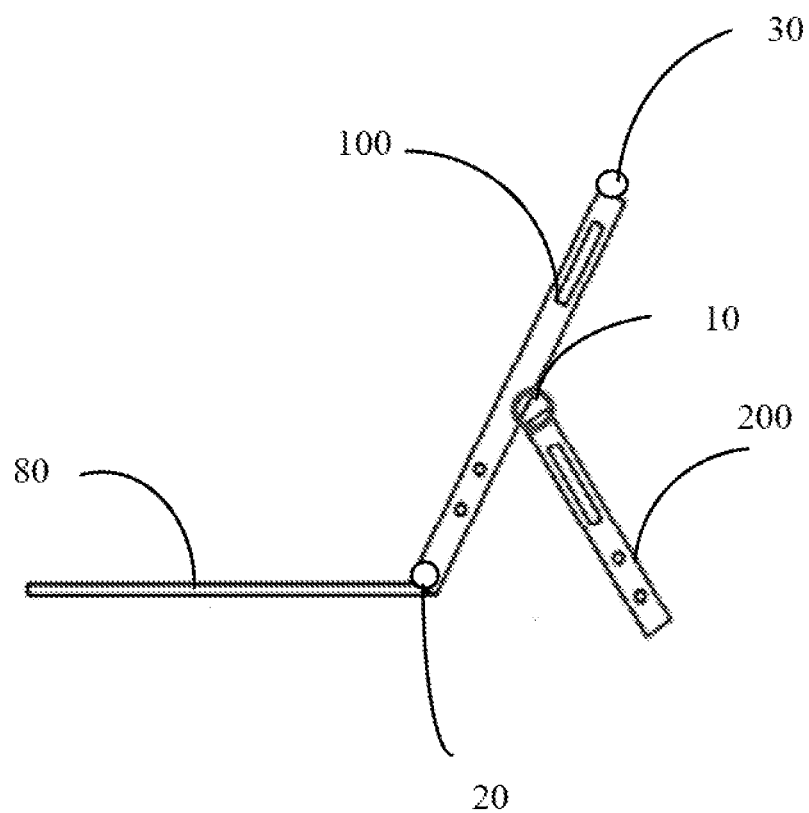
FIG. 4 is a diagrammatic view of an electronic device with integration function being integrated in one integrating mode.

FIG. 4 illustrates in one embodiment, the electronic device 100 further includes a shell keyboard 80, when the shell keyboard 80 is folded on the electronic device 100, the shell keyboard 80 can be used as a cover for the electronic device 100. The shell keyboard 80 can connect to the second connection port 20 of the electronic device 100 when the second connection port 20 does not connect to the second device 300. When the shell keyboard 80 is connected to the second connection port 20 of the electronic device 100, the shell keyboard 80 can be used as an external keyboard for the electronic device 100. The shell keyboard 80 can be a mechanical keyboard or a touch keyboard.

As shown in FIG. 2, the electronic device 100 further includes an input/output unit 90, the input/output unit 90 is provided for inputting data and displaying content. The input/output unit 90 can be touch screen.

As shown in FIG. 3, in one embodiment, the port detection module 11 is further used to detect whether the second connection port is connected to the second device 300 after detecting that the first connection port 10 has been connected to the first device 200. In detail, the port detection module 11 sends a handshake signal via the second connection port 20, and detects whether a response signal is received from the second connection port 20, when the port detection module 11 receives the response signal, the port detection module 11 determines the second connection port 20 is connected to the second device 300.

In one embodiment, the second connection port 20 is set at a bottom end of the electronic device 100, the second device 300 further includes a fourth connection port 33 set at an upper end of the second device 300. The second device 300 is connected to the second connection port 20 of the electronic device 100 via the fourth connection port 33. In the embodiment, the second connection port 20 is a male/female port while the fourth connection port 33 is a female/male port. For example, the fourth connection port 33 is a mini USB female port and the second connection port 20 is a mini USB male port.

In one embodiment, the power source detection module 12 determines whether the power port 30 is connected to the power adapter when the port detection module 11 detects the first connection port 10 is connected to the first device 200 and the second connection port 20 is connected to the second device 300.

When the power source detection module 12 determines the power port 30 is connected to the power adapter and the port detection module 11 detects that the first connection port 10 is connected to the first device 200 and the second connection port 20 is connected to the second device 300, the driving control module 13 further drives the processor 21 of the first device 200 and the processor 31 of the second device 300 to cooperate with the processor 50 of the electronic device 100 to compute, thus to further enhance the computing capacity of the electronic device 100.

When the power source detection module 12 determines the power port 30 is connected to the power adapter and the port detection module 11 detects the first connection port 10 is connected to the first device 200 and the second connection port 20 is connected to the second device 300, the storing control module 14 further controls the storage device 60 of the electronic device 100, the storage device 22 of the first device 200, and the storage device 32 of the second device 300 to establish data connection. When there is a need to store data, the storing control module 14 further controls the data to be stored to any one of the storage device 60, the storage device 22, and the storage device 32.

The power management unit 70 is further connected to the second connection port 20, and provides the power voltage to the second connection port 20 and the first connection port 10 when the power port 30 is connected to the power adapter. Therefore, the power management unit 70 can power the first device 200 connected to the first connection port 10 and the second device 300 connected to the second connection port 20.

In one embodiment, when the port detection module 11 detects the first connection port 10 is connected to the first device 200 and the second connection port 20 is connected to the second device 300, the driving control module 13 further drives the input/output unit 90 of the electronic device 100 to function as a display for the electronic device 100 to display corresponding content, and drives an input/output unit 34 of the second device 300 to function as an input device for the electronic device 100. In the embodiment, the input/output unit 34 of the second device 300 can be a touch screen.

In one embodiment, when the power port 30 does not connect to the power adapter, the driving control module 13 only drives the input/output unit 34 of the second device 300 to function as the input device for the electronic device 100, and does not drive the processor 21 of the first device 200 and the processor 31 of the second device 300 to work. At this time, when there is a need to store data, the storing control module 14 only stores the data to the storage device 60 of the electronic device 100.

Figure 5:
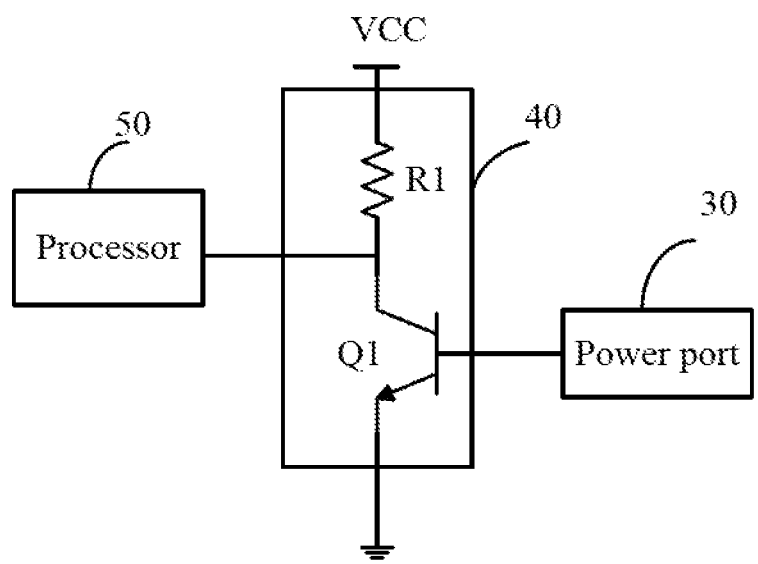
FIG. 5 is a circuit diagram of a detection unit of the electronic device with integration function of FIG. 1.

FIG. 5 illustrates the detection unit 40 includes a resistor R1 and a negative-positive-negative (npn) bipolar junction transistor (BJT) Q1 connected between a voltage port VCC and ground in series. A base of the npn BJT Q1 is connected to the power port 30, an emitter is grounded, and a collector is connected to the resistor R1. In the embodiment, the first detection signal is a digital-low signal (logic 0), and the second detection signal is a digital-high signal (logic 1). The processor 50 is connected to the collector of the npn BJT Q1.

When the power port 30 is connected to the power adapter, the power port 30 is at a high voltage, which causes the npn BJT Q1 to turn on. The processor 50 is electrically connected to the ground via the npn BJT Q1 which is turned on and receives the digital-low signal, namely the first detection signal accordingly. When the power port 30 does not connect to the power adapter, the power port 30 is at a low voltage, which causes the npn BJT Q1 to turn off. The processor 50 is electrically connected to the voltage port VCC and receives the digital-high signal, namely the second detection signal accordingly. As described above, the power source detection module 12 determines the power port 30 is connected to the power adapter when receiving the first detection signal, and determines the power port 30 does not connect to the power adapter when receiving the second detection signal. In one embodiment, the npn BJT Q1 can be replaced by a n-channel metal-oxide-semiconductor field effect transistor (NMOSFET), or can be replaced by a pnp BJT or a PMOSFET.

As shown in FIG. 2, the electronic device 100 further includes a built-in battery 91, and the power management unit 70 is further connected to the built-in battery 91. When the power port 30 is connected to the power adapter, the power management unit 70 further converts a voltage from the power adapter to corresponding voltages to power corresponding components, such as the processor 50, the storage device 60, of the electronic device 100, thus powering the components of the electronic device 100. When the power port 30 does not connect to the power adapter, the power management unit 70 receives a voltage from the built-in battery 91 and converts the received voltage to the corresponding voltages to power the corresponding components of the electronic device 100. In one embodiment, the voltage port VCC is connected to the built-in battery 91 and is at a high voltage, such as 5 volts.

In the embodiment, the electronic device 100 and the second device 300 are tablet computers and the first device 200 is a mobile phone.

The first connection port 10 and the second connection 20 particular can be USB 3.1 ports.

Figure 6:
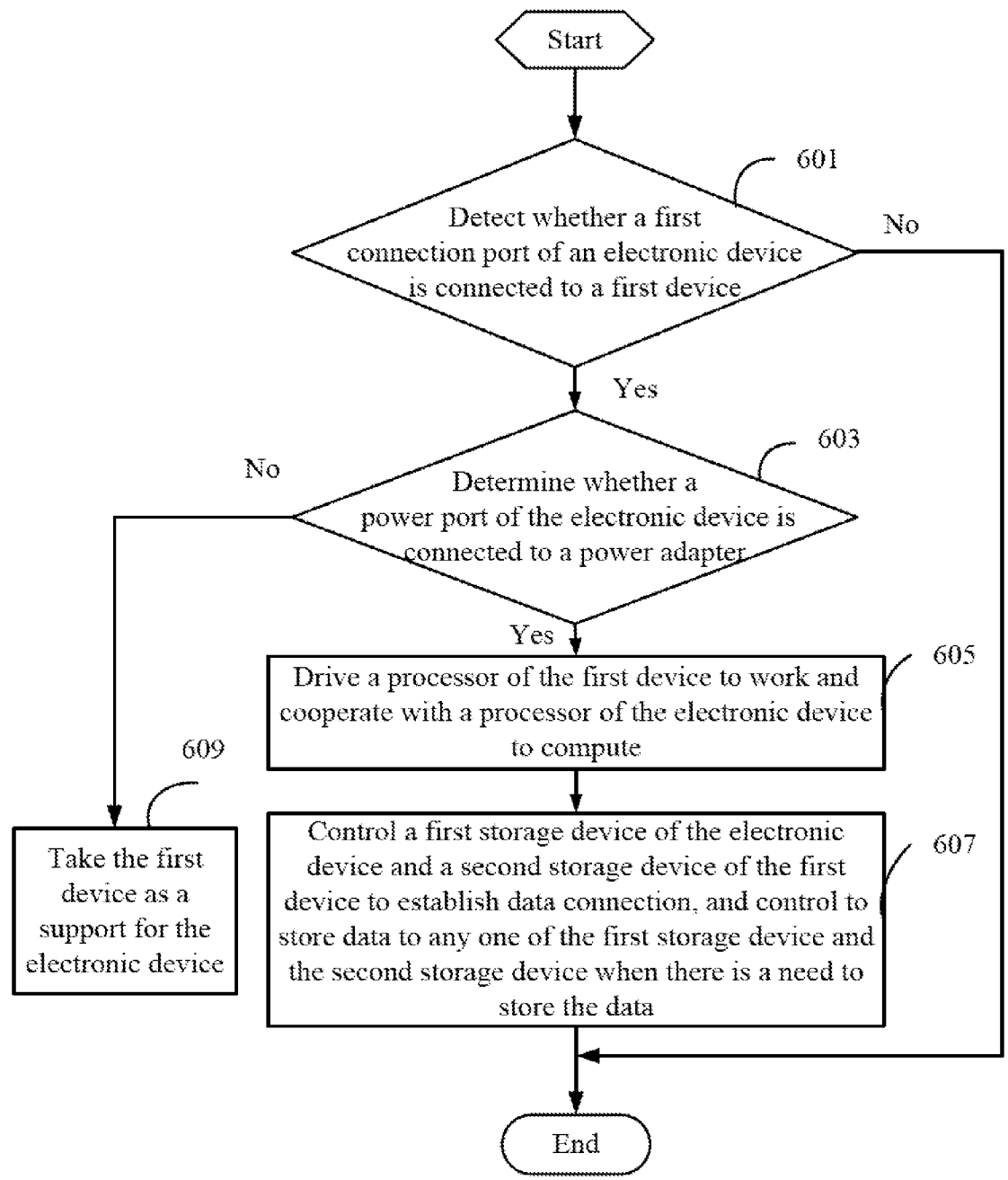
FIG. 6 is a flowchart illustrating a multiple device integrating control method.

FIG. 6 illustrates a flowchart of a multiple device integrating method. The method is provided by way of example, as there are a variety of ways to carry out the method. The method described below can be carried out using the configurations illustrated in FIG. 2, for example, and various elements of these figures are referenced in explaining the example method. Each block shown in FIG. 6 represents one or more processes, methods, or subroutines carried out in the example method. Additionally, the illustrated order of blocks is by example only and the order of the blocks can be changed. The example method can begin at block 601.

In block 601, a port detection module detects whether a first connection port of an electronic device is connected to a first device. If yes, the process goes to block 603, otherwise, the process is ended. In detail, the port detection module sends a handshake signal via the first connection port, and determines the first connection port is connected to the first device when receiving the response signal from the first connection port.

In block 603, a power source detection module determines whether a power port of the electronic device is connected to a power adapter. If yes, the process goes to block 605, otherwise, the process goes to block 609. In detail, the power source detection module determines the power port is connected to the power adapter when receiving a first detection signal produced by a detection unit, and determines the power port is not connected to the power adapter when receiving a second detection signal produced by the detection unit.

In block 605, a driving control module drives a processor of the first device to cooperate with the processor of the electronic device to compute.

In block 607, a storing control module controls a storage device of the electronic device and a storage device of the first device to establish data connection, and controls to store data to any one of the storage devices of the electronic device and the first device when there is a need to store the data.

In block 609, the first device only functions as a support for the electronic device.

In the embodiment, the method further includes: the port detection module further detects whether a second connection port of the electronic device is connected to a second device after detecting the first connection port has been connected to the first device. In detail, the port detection module sends a handshake signal via the second connection port, and determines the second connection port is connected to the second device when receiving a response signal from the second connection port.

The method further includes: when the power source detection module determines the power port is connected to the power adapter and the port detection module detects the first connection port is connected to the first device and the second connection port is connected to the second device, the driving control module further drives the processor of the first device and the processor of the second device to cooperate with the processor of the electronic device to compute.

The method further includes: when the power source detection module determines the power port is connected to the power adapter and the port detection module detects the first connection port is connected to the first device and the second connection is connected to the second device, the storing control module further controls the storage device of the electronic device, the storage device of the first device, and the storage device of the second device to establish data connection, and controls the data to be stored to any one of the storage devices, when there is the need to store the data.

The method further includes: when the port detection module detects the first connection port is connected to the first device and the second connection port is connected to the second device, the driving control module further drives an input/output unit of the electronic device to function as a display to display corresponding content, and drives an input/output unit of the second device to function as an input device for the electronic device.

The method further includes: the power management unit provides the power voltage to the first connection port and the second connection port to respectively power the first device and the second when the power port is connected to the power adapter.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device with integration function, comprising:
   a power port configured to connect to a power adapter;
   a first connection port;
   a detection unit connected to the power port, configured to detect a voltage of the power port to produce a corresponding detection signal;
   a first storage device configured to store a plurality of modules which are collections of instructions; and
   at least one first processer configured to execute the plurality of modules, the plurality of modules comprising:
      a port detection module configured to detect whether the first connection port is connected to a first device;
      a power source detection module configured to determine whether the power port is connected to the power adapter according to the detection signal produced by the detection unit when the first connection port is connected to the first device; and
      a driving control module configured to drive a second processor of the first device to work and cooperate with the at least one first processor of the electronic device to compute in response to the power port being connected to the power adapter;
      wherein the driving control module does not drive the second processor of the first device to work in response to the power port being not connected to the power adapter.

2. The electronic device according to claim 1, wherein the first connection port is set at a backside of the electronic device, when the first connection port is connected to the first device, the first device is used as a support for the electronic device.

3. The electronic device according to claim 2, wherein the plurality of modules further comprise a storing control module, the storing control module is configured to control the first storage device of the electronic device and a second storage device of the first device to establish data connection, and control to store data to any one of the first storage device and the second storage device when there is a need to store the data.

4. The electronic device according to claim 3, further comprises a second connection port, wherein the port detection module is further configured to detect whether the second connection port is connected to a second device after detecting the first connection port has been connected to the first device; the driving control module is further configured to drive the second processor of the first device and a third processor of the second device to work and cooperate with the at least one first processor of the electronic device to compute when the power source detection module determines the power port is connected to the power adapter and the port detection module detects the first connection port is connected to the first device and the second connection port is connected to the second device.

5. The electronic device according to claim 4, wherein when the power source detection module determines the power port is connected to the power adapter and the port detection module detects the first connection port is connected to the first device and the second connection is connected to the second device, the storing control module is further configured to control the first storage device of the electronic device, the second storage device of the first device, and a third storage device of the second device to establish data connection, and controls to store the data to any one of the first storage device, the second storage device, and the third storage device when there is the need to store the data.

6. The electronic device according to claim 4, further comprises a power management unit configured to provide a power voltage to the first connection port and the second connection port to respectively power the first device and the second when the power port is connected to the power adapter.

7. The electronic device according to claim 4, further comprises a shell keyboard configured to function as a cover for the electronic device when the shell keyboard is folded on the electronic device, and further configured to connect to the second connection port of the electronic device to function as an external keyboard for the electronic device when the second connection port does not connect to the second device.

8. The electronic device according to claim 4, further comprises a first input/output unit, wherein when the port detection module detects the first connection port is connected to the first device and the second connection port is connected to the second device, the driving control module further drives the first input/output unit of the electronic device to function as a display to display corresponding content, and drives a second input/output unit of the second device to function as an input device for the electronic device.

9. The electronic device according to claim 1, wherein the power source detection module determines the power port is connected to the power adapter when receiving a first detection signal, and determines the power port does not connect to the power adapter when receiving a second detection signal.

10. The electronic device according to claim 9, wherein the detection unit further comprises a resistor and a negative-positive-negative (NPN) bipolar junction transistor (BJT) connected between a voltage port and ground in series; a base of the NPN BJT is connected to the power port, an emitter of the NPN BJT is grounded, and a collector of the NPN BJT is connected to the resistor, the at least one first processor is connected to the collector of the NPN BJT; when the power port is connected to the power adapter, the power port is at a high voltage, which causes the NPN BJT to turn on, the at least one first processor is electrically connected to the ground via the NPN BJT which is turned on and receives the first detection signal with digital-low; when the power port is not connected to the power adapter, the power port is at a low voltage, which causes the NPN BJT to turn off, the at least one first processor is electrically connected to the voltage port and receives the second detection signal with digital-high accordingly.

11. An electronic device assembly comprising:
A multiple device integrating control method, applied in an electronic device with a first processor, comprising:
detecting whether a first connection port of the electronic device is connected to a first device;
determining whether a power port of the electronic device is connected to a power adapter when the first connection port is connected to the first device;
driving a second processor of the first device to work and cooperate with the first processor of the electronic device to compute in response to the power port of the electronic device being connected to the power adapter; and
suspending the second processor of the first device in response to the power port of the electronic device being not connected to the power adapter.

12. The method according to claim 11, further comprises:
taking the first device as a support for the electronic device when the power port of the electronic device is not connected to the power adapter.

13. The method according to claim 12, further comprises:
controlling a first storage device of the electronic device and a second storage device of the first device to establish data connection when the power port of the electronic device is connected to the power adapter; and
controlling to store data to any one of the first storage device and the second storage device when there is a need to store the data.

14. The method according to claim 13, further comprises:
detecting whether a second connection port of the electronic device is connected to a second device after detecting the first connection port has been connected to the first device; and driving the second processor of the first device and a third processor of the second device to work and cooperate with the first processor of the electronic device to compute when the power port is connected to the power adapter and the first connection port is connected to the first device and the second connection port is connected to the second device.

15. The method according to claim 14, further comprises:
controlling the first storage device of the electronic device, the second storage device of the first device, and a third storage device of the second device to establish data connection when the power port is connected to the power adapter and the first connection port is connected to the first device and the second connection is connected to the second device; and
controlling to store the data to any one of the first storage device, the second storage device, and the third storage device when there is the need to store the data.

16. The method according to claim 12, wherein the determining whether a power port of the electronic device is connected to a power adapter further comprises:
determining the power port is connected to the power adapter when receiving a first detection signal produced by a detection unit of the electronic device when the detection unit detects a high voltage from the power port; and
determining the power port is not connected to the power adapter when receiving a second detection signal produced by the detection unit when the detection unit detects a low voltage from the power port.

17. The electronic device according to claim 1, further comprises a second connection port and a first input/output unit; wherein the port detection module is further configured to detect whether the second connection port is connected to a second device after detecting the first connection port has been connected to the first device; the driving control module does not drive the second processor of the first device and a third processor of the second device to work when the power source detection module determines the power port does not connect to the power adapter and the port detection module detects the first connection port is connected to the first device and the second connection port is connected to the second device; and the driving control module further drives the first input/output unit of the electronic device to function as a display to display corresponding content, and drives a second input/output unit of the second device to function as an input device for the electronic device.

18. The method according to claim 11, further comprises:
detecting whether a second connection port of the electronic device is connected to a second device after detecting the first connection port has been connected to the first device; and
driving a first input/output unit of the electronic device to function as a display to display corresponding content, and driving a second input/output unit of the second device to function as an input device for the electronic device.

* * * * *